Dec. 6, 1960
J. B. GILL
2,962,814
TOOL FOR CUTTING PIPE
Filed May 4, 1959
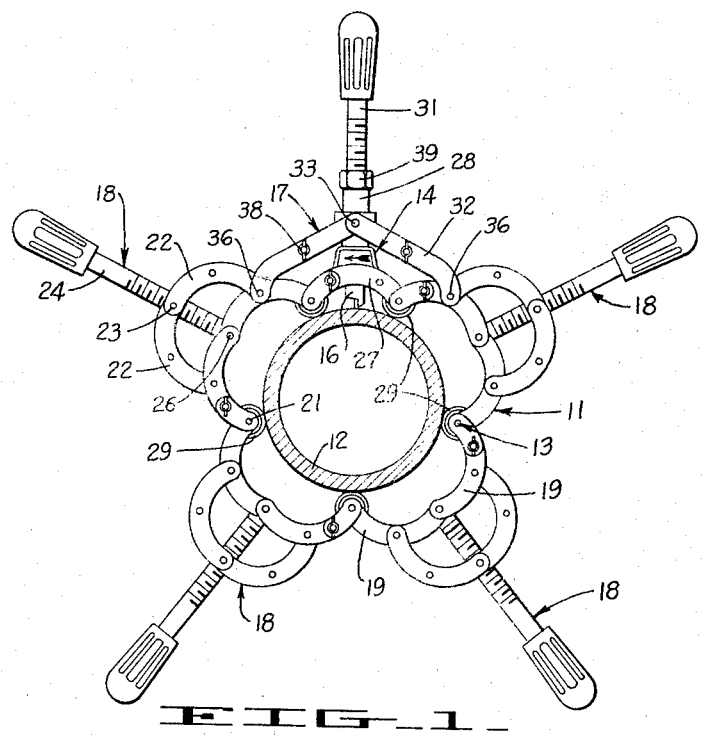
FIG_1_
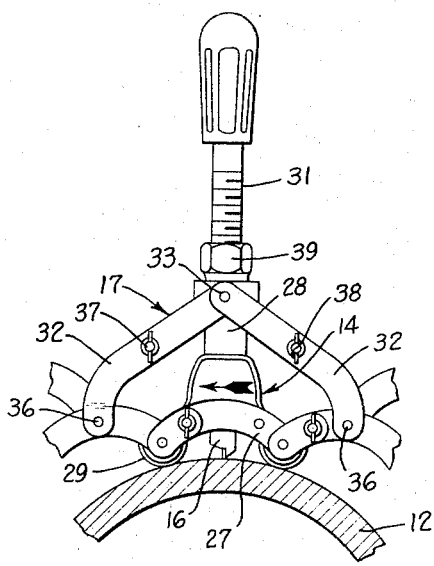
FIG_2_
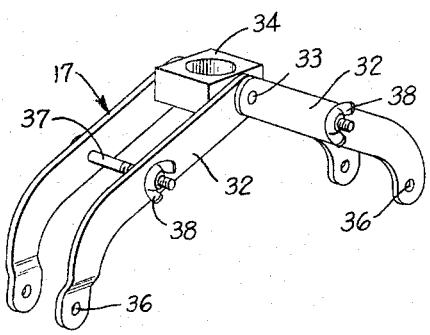
FIG_3_
INVENTOR.
JOHN B. GILL
BY *A. Schapp*
ATTORNEY

United States Patent Office 2,962,814
Patented Dec. 6, 1960

2,962,814

TOOL FOR CUTTING PIPE

John B. Gill, P.O. Box 2127, Torrance, Calif.

Filed May 4, 1959, Ser. No. 810,665

9 Claims. (Cl. 30—100)

The present invention relates to improvements in a tool for cutting pipe of the general character disclosed in Patent No. 2,433,606, granted on December 30, 1947, to John B. Gill et al. for a Pipe Cutting Tool.

This type of pipe cutting tool consists of a plurality of link units which are pivotally joined together to form a continuous chain adapted to encircle the pipe to be cut. Carried between two adjacent link units is a link upon which is mounted a cutting blade. Rollers are journaled at the pivot connections between the link units and serve to support the chain as it is rotated around the pipe.

During the rotation of the chain around the pipe, the cutting blade is advanced radially inwardly to cut through and sever the pipe, the rollers preferably being flanged to ride in the kerf and keep the chain in place during the cutting operation.

Adjustment of the spacing between the rollers is provided in order to adapt the chain for use with different sizes of pipe. This is accomplished by forming the link units from a pair of arcuate links pivoted together at the middle of the unit, and pivoting a pair of auxiliary links to the medial portions of the arcuate links.

The auxiliary links are pivotally connected together on a radial line which passes through the pivotal connection of the arcuate links, and a radial handle is revolvably held in one of the pivotal connections and threadedly engaged in the other. Rotation of the handle, acting through the links, serves to contract or spread the link units, bringing the rollers closer together or further apart, as required.

The cutting blade is advanced inwardly against the pipe by means of a radially extending handle threadedly engaged in the cutting blade mounting. Preferably, this handle extends radially outwardly away from the chain for use in conjunction with the link unit handles in rotating the chain around the pipe.

The tangential drag upon the cutting blade as it cuts through the pipe, and the force exerted upon the blade advancing handle to move the chain around the pipe, both tend to cock the link which carries the cutting blade. This has the effect of tightening the chain, due to shortening of its effective length, and creates a tendency for the rollers to bind and impose excessive resistance to movement of the chain around the pipe.

The cutting tool of the present invention incorporates a novel stabilizing linkage which is adapted to transmit the tangential forces to the adjacent link units and thus resist cocking of the blade housing link and consequent shortening of the chain.

It is, therefore, a principal object of the present invention to provide a tool for cutting pipe in the form of a roller supported chain which includes a device for resisting cocking of a chain link, thus avoiding excessive tightening of the chain around the pipe to be cut.

Another object of the present invention is the provision of a pipe cutting tool stabilizing linkage of the character described which is self-compensating when used with a chain having adjustable length link units, the stabilizing linkage being effective to hold the blade housing link in the desired relationship to the pipe at all settings of the link units.

A further object of the invention is to provide a stabilizing linkage of the character described which is of simple and sturdy structure, and which may be easily and quickly installed on existing cutter chain assemblies.

A still further object of the present invention is to provide a stabilizing linkage of the character described which cooperates with the structure of the adjustable link unit to transmit cocking forces to rollers spaced from the rollers on the ends of the cutting blade supporting link by a distance sufficient to place the axes of these rollers on a chord which passes inwardly of the outer peripheral surface of the pipe, it having been found that such geometrical relationship substantially prevents binding as the chain is rotated around the pipe.

Further objects and advantages of my invention will become apparent as the specification progresses, and the new and useful features of my tool for cutting pipe will be fully defined in the claims attached hereto.

The preferred form of the invention is illustrated in the accompanying drawing, forming part of this application, in which:

Figure 1 shows an end view of en eight inch asbestos-cement pipe with a pipe cutter constructed in accordance with my invention applied thereto;

Figure 2, a fragmentary view of the cutting blade portion of the pipe cutter applied to a twelve inch pipe to illustrate the self-compensating action of the stabilizer; and Figure 3, an enlarged perspective detail view of a stabilizer linkage attachment forming a part of the present invention.

While I have shown only the preferred form of my invention. it should be understood that various changes or modifications may be made within the scope of the claims hereto attached, without departing from the spirit of the invention.

Referring to the drawing in details, the pipe cutting tool of the present invention consists basically of a chain 11 adapted for placing around a pipe 12 and comprising a plurality of links having pivotal joints 13 connecting the same, together with means 14 on one of the links formed to support a pipe cutting blade 16, and stabilizing means 17 connecting the means 14 to an adjacent link so as to resist cocking and shortening of the chain 11.

As will be understood, the chain 11 may consist of straight or arcuate links pivotally joined at their ends and supported on rollers journaled at the pivots. However, in order to accommodate the chain to different nominal sizes and classes of pipe, it is preferred to utilize a plurality of link units 18 which can be adjusted to vary their effective length.

The construction of these "link units " is disclosed in the aforementioned Patent No. 2,433,606, and each link unit includes a pair of arcuate links 19 hinged together in end to end relation, the outer ends of the links 19 being connected by a pivot pin 21 to provide the joints 13 and form a continuous chain.

Also included in each link unit is a pair of auxiliary links 22 which are pivoted to the medial portion of the arcuate links 19 and which are pivotally connected at their upper ends by pin 23.

A radial handle 24 is revolvably held at the hinge connection 26, of links 19, and is threadedly engaged with pin 23. Rotation of the handle 24 will cause the pins 23 and 26 to spread apart or contract and effect spreading or contracting of the joints 13, thus lengthening or shortening the chain to fit the pipe. For much larger or smaller pipes, link units 18 are added or taken away.

Interposed in the chain 11, between two of the joints 13, is a single link 27 which supports the cutting blade 16. Preferably, and as here shown, the blade 16 is carried in a housing 28 of generally tubular form. The housing has its axis perpendicular to a line drawn between the joints 13 at the ends of the link 27 so that it will lie on a radius of the pipe when the supporting rollers 29 are in contact with the pipe periphery.

The cutter blade 16 is slidably mounted in the housing 28 and may be advanced and retracted by a radially extending handle 31 as the cut progresses and is finally completed.

The resistance of the pipe material to the progress of the blade 16 drags on the blade and tends to cause the link 27 to become cocked with respect to the path of movement of the chain. A similar cocking action on the link 27 is encountered each time the handle 31 is used to advance the chain around the pipe.

As an important feature of the present invention, the means 17 acts to transmit these tangentially oriented cocking forces to one or both of the adjacent link units 18 in such a manner that the cocking effect is substantially eliminated.

As may be seen from Figures 1 and 2 of the drawing, drag of the cutter blade 16 or turning force on handle 31 presses the leading roller 29, on link 27, against the pipe while urging the trailing roller away from it.

It has been found that the load-bearing rollers 29 should be spaced apart far enough, with respect to the pipe size, to provide that a straight line drawn between the axes of the rollers will pass inwardly of the outer peripheral surface of the pipe. If this line approaches, or is outside of, the pipe surface, an increased resistance to the travel of the chain is encounted.

As may be seen from the drawing, the link 27 is so short that the described geometrical relationship cannot obtain with the larger sizes of pipe. Therefore, the stabilizer means 17 is provided in the form of a linkage which transmits the tangential forces through the adjacent link unit 18 and to the roller 29 on its far end. The span between load supporting rollers then becomes sufficient to provide the desired geometrical relationship.

As here shown, the stabilizing linkage 17 consists of a pair of somewhat L-shaped links 32 which are pivotally connected between the blade housing 28 and the adjacent link units 18 on either side of the blade housing link 27.

As a feature of the invention, the stabilizing linkage is self-compensating, that is, it adjusts automatically to changes in the span of the link units. This may be seen from a comparison of Figures 1 and 2. Figure 1 illustrates the relative positioning of the parts as parts as applied to an eight inch pipe, and Figure 2 shows the stabilizer linkage when mounted on a twelve inch pipe.

The self-compensating feature is provided by journaling the upper ends of links 32 on a pin 33 attached to a block 34 which is mounted for sliding radial movement on the tubular housing 28. The opposite ends of the links 32 are journaled on pins 36 which project from the medial portions of the arcuate links 19 in the adjacent link units 18.

As will be understood, while reference is made to two arcuate links 19 and two auxiliary links 22 in each link unit, the chain 11 may be, and preferably is, made with corresponding links (not shown) which are attached in spaced parallel relation to the links shown so that the handles 24 pass between the sets of links.

The stabilizing links are adapted for quick and easy mounting and dismounting and may be readily installed on cutter chain assemblies not previously having the stabilizing feature. This is accomplished by providing pins 33 and 36 as outwardly projecting studs and by furnishing bolts 37, which pass through spaced sets of links 32, and wing nuts 38 on the bolts 37 which serve to clamp the links 32 together on the pins 33 and 36.

To dismount, the wing nuts 38 are backed off whereupon the links 32 may be pulled off the stud pins 33 and 36.

To install the stabilizing linkage of the present invention on existing cutter chains, the retaining nut 39 is removed from the tubular housing 28 and the block 34 is slid onto the housing. The nut 39 is replaced, and the links 32 are engaged over the pins 33 and 36 and clamped in place by tightening the wing nuts 38. The unit is then in condition to transmit tangential forces from the cutter blade link 27 to the adjacent link units 18.

I claim:

1. In a pipe cutting tool, a chain adapted for placing around a pipe and comprising a plurality of links having pivotal joints connecting the same, means on one of said links formed to support a pipe cutting blade and stabilizing means connecting said first named means to an adjacent link for transmitting tangential forces from the cutting blade to said adjacent link so as to resist cocking and shortening of the chain.

2. In a pipe cutting tool, a chain adapted for placing around a pipe and comprising a plurality of links having pivotal joints connecting the same, a housing attached to one of said links and formed to support a pipe cutting blade, and a stabilizing link pivotally connected between said housing and an adjacent link for transmitting tangential forces from the cutting blade housing to said adjacent link so as to resist cocking of the housing link and consequent shortening of the chain.

3. In a pipe cutting tool, a chain adapted for placing around a pipe and comprising a plurality of links having pivotal joints connecting the same, a housing attached to one of said links and formed to support a pipe cutting blade, said housing extending perpendicularly to the attached link so as to be radially disposed with respect to a pipe being cut, a member mounted for sliding movement along said housing radially of the pipe, and a stabilizing link pivotally connected between said member and the adjacent links for transmitting tangential forces from the cutting blade housing to said adjacent links so as to resist cocking of the housing link and consequent shortening of the chain.

4. In a pipe cutting tool, a chain adapted for placing around a pipe and comprising a plurality of links having pivotal joints connecting the same, a housing attached to one of said links and formed to support a pipe cutting blade, and a pair of stabilizing links pivotally connected between said housing and the adjacent links for transmitting tangential forces from the cutting blade housing to the adjacent links so as to resist cocking of the housing link and consequent shortening of the chain.

5. In a pipe cutting tool, a chain adapted for placing around a pipe and comprising a plurality of links having pivotal joints connecting the same, a housing attached to one of said links and formed to support a pipe cutting blade, said housing extending perpendicularly to the attached link so as to be radially disposed with respect to a pipe being cut, a member mounted for sliding movement along said housing radially of the pipe, and a pair of stabilizing links pivotally connected between said member and the adjacent links for transmitting tangential forces from the cutting blade housing to the adjacent links so as to resist cocking of the housing link and consequent shortening of the chain.

6. In a pipe cutting tool, a chain adapted for placing around a pipe and comprising a plurality of arcuate links having pivotal joints connecting the same, two auxiliary links pivoted to two adjacent chain links intermediate the lengths thereof and being connected by a hinge joint to form a link unit of adjustable length, said hinge joint being in radial alignment with the joint between the two adjacent chain links, a radial handle revolvably held in one of the last mentioned joints and threadedly engaged in the other whereby the spacing between the two joints may be adjusted for spreading and contracting the adjacent chain links, an arcuate link connecting two of said link units, a housing attached to said last mentioned link and being formed to support a pipe cutting blade, and a pair of stabilizing links pivotally connected between said housing and one of the arcuate links in the adjacent link units for transmitting tangential forces from the cutting blade housing to the adjacent link units so as to resist cocking of the housing link and consequent shortening of the chain.

7. In a pipe cutting tool, a chain adapted for placing around a pipe and comprising a plurality of arcuate links having pivotal joints connecting the same, two auxiliary links pivoted to two adjacent chain links intermediate the lengths thereof and being connected by a hinge joint to form a link unit of adjustable length, said hinge joint being in radial alignment with the joint between the said two adjacent chain links, a radial handle revolvably held in one of the last mentioned joints and threadedly engaged in the other whereby the spacing between the two joints may be adjusted for spreading and contracting the adjacent chain links, an arcuate link connecting two of said link units, a housing attached to said last mentioned link and being formed to support a pipe cutting blade, said housing extending perpendicularly to the attached link so as to be radially disposed with respect to a pipe being cut, a member mounted for sliding movement along said housing radially of the pipe, and a pair of stabilizing links pivotally connected between said member and one of the arcuate links in the adjacent link units for transmitting tangential forces from the cutting blade housing to the adjacent link units so as to resist cocking of the housing link and consequent shortening of the chain without interfering with said spreading and contracting of the link units.

8. In a pipe cutting tool, a chain adapted for placing around a pipe and comprising a plurality of arcuate links having pivotal joints connecting the same, two auxiliary links pivoted to two adjacent chain links intermediate the lengths thereof and being connected by a hinge joint to form a link unit of adjustable length, said hinge joint being in radial alignment with the joint between the said two adjacent chain links, a radial handle revolvably held in one of the last mentioned joints and threadedly engaged in the other whereby the spacing between the two joints may be adjusted for spreading and contracting the adjacent chain links, the handle projecting radially beyond the two joints to serve as a manipulating member for revolving the chain about the pipe, an arcuate link connecting two of said link units, a housing attached to said last mentioned link and being formed to support a pipe cutting blade, said housing extending perpendicularly to the attached link so as to be radially disposed with respect to a pipe being cut, a member mounted for sliding movement along said housing radially of the pipe, and a pair of stabilizing links pivotally connected between said member and one of the arcuate links in the adjacent link units for transmitting cocking forces exerted upon the cutting blade housing link by chain rotating pressure on said handle and by resistance of the blade during cutting to the adjacent link units and thus resist shortening of the chain.

9. In a pipe cutting tool, a chain adapted for placing around a pipe and comprising a plurality of arcuate links having pivotal joints connecting the same, two auxiliary links pivoted to two adjacent chain links intermediate the lengths thereof and being connected by a hinge joint to form a link unit of adjustable length, said hinge joint being in radial alignment with the joint between the said two adjacent chain links, a radial handle revolvably held in one of the last mentioned joints and threadedly engaged in the other whereby the spacing between the two joints may be adjusted for spreading and contracting the adjacent chain links, the handle projecting radially beyond the two joints to serve as a manipulating member for revolving the chain about the pipe, a plurality of rollers journaled on the chain at the pivotal joints between adjacent link units and adapted to support the chain in its movement around the pipe, an arcuate link connecting two of said link units, a tubular housing attached to said last mentioned link and being formed to support a pipe cutting blade, said housing having its length perpendicular to the chord of the last mentioned link so as to lie on a radius of a pipe to be cut, a member journaled for sliding movement along the length of said housing radially of the pipe, and a pair of stabilizing links pivotally connected between said member and one of the arcuate links in the adjacent link units for transmitting tangential forces from the cutting blade housing to the adjacent link units so as to resist cocking of the housing link and consequent shortening of the chain without interfering with said spreading and contracting of the link units.

No references cited.